United States Patent  [19]  
Kilgore

[10] Patent No.: US 6,446,320 B2  
[45] Date of Patent: Sep. 10, 2002

(54) METHOD OF RETAINING A FIRST HOUSING TO A SECOND HOUSING USING A SELF-TIGHTENING CLIP

(75) Inventor: Jason T. Kilgore, Newport News, VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/770,981

(22) Filed: Jan. 26, 2001

Related U.S. Application Data

(62) Division of application No. 09/342,589, filed on Jun. 29, 1999, now Pat. No. 6,227,785.

(51) Int. Cl.[7] .............................................. B23P 11/00
(52) U.S. Cl. ........................................... 29/434; 29/453
(58) Field of Search .................................. 411/433, 437, 411/525, 526, 527, 521; 29/434, 453

(56) References Cited

U.S. PATENT DOCUMENTS

| 1,017,471 | A | * | 2/1912 | Ryden et al. |
| 1,859,271 | A |   | 5/1932 | Reiter |
| 2,342,910 | A | * | 2/1944 | Tinnerman |
| 2,458,409 | A |   | 1/1949 | Paige |
| 3,036,793 | A |   | 5/1962 | Becker |
| 3,680,272 | A |   | 8/1972 | Meyer ........................ 52/717 |
| 4,474,160 | A |   | 10/1984 | Gartner ..................... 123/468 |
| 4,641,401 | A |   | 2/1987 | Hasegawa .................. 243/681 |
| 4,847,959 | A |   | 7/1989 | Shimada et al. .............. 24/671 |
| 4,984,548 | A |   | 1/1991 | Hudson, Jr. ................ 123/470 |
| 5,038,738 | A |   | 8/1991 | Hafner et al. .............. 123/470 |
| 5,195,860 | A |   | 3/1993 | Steyn ........................ 411/526 |
| 5,301,647 | A |   | 4/1994 | Lorraine .................... 123/470 |
| 5,577,478 | A |   | 11/1996 | Tuckey ....................... 123/456 |
| 5,609,138 | A |   | 3/1997 | Mutschler .................. 123/463 |
| 5,616,037 | A |   | 4/1997 | Lorraine et al. ........... 439/130 |

* cited by examiner

Primary Examiner—David P. Bryant

(57) ABSTRACT

A self-tightening clip having a planar member and at least one retention member attached to the planar member. The planar member includes an inner perimeter, an outer perimeter, and defines a central axis. The least one retention member including a planar leg portion and a planar hook portion. The leg portion extends from the inner perimeter in a first direction along the central axis. The hook portion projects from the leg portion toward the central axis in a second direction, which is opposite the first direction along the central axis. The hook portion is acute to the central axis and has a free end located on an imaginary perimeter concentric to the inner perimeter of the planar member. The central axis and a plane passing through the hook portion of the at least one retention member form an angle in the range of approximately 20°–30°.

14 Claims, 2 Drawing Sheets

METHOD OF RETAINING A FIRST HOUSING TO A SECOND HOUSING USING A SELF-TIGHTENING CLIP

This is a divisional of application Ser. No. 09/342,589 filed on Jun. 29, 1999, now U.S. Pat. No. 6,227,785.

BACKGROUND OF THE INVENTION

This invention relates to a device that secures a first housing to a second housing. In particular, the present invention relates to a unitary sheet metal clip that self-tightens on a retained housing when the retained housing is displaced.

SUMMARY OF THE INVENTION

The present invention provides a clip having a planar member and at least one retention member attached to the planar member. The planar member includes an inner perimeter, an outer perimeter, and defines a central axis. The least one retention member including a planar leg portion and a planar hook portion. The arrangement of the leg portion and the hook portion of the retention member create the self-tightening feature of the inventive clip.

The leg portion extends from the inner perimeter in a first direction along the central axis. The hook portion projects from the leg portion toward the central axis in a second direction, which is opposite the first direction along the central axis. The hook portion is acute to the central axis and has a free end located on an imaginary perimeter concentric to the inner perimeter of the planar member. The central axis and a plane passing through the hook portion of the at least one retention member form an angle in the range of approximately 20°–30°. Preferably, the angle comprises approximately 24°.

In a preferred embodiment of the invention, the planar member comprises an annulus, the imaginary perimeter comprises a circle, and the at least one retention member comprises a plurality of retention members. Particularly, five retention members uniformly disposed about the inner perimeter of the planar annulus.

The preferred embodiment further comprises a plurality of stiffeners. At least one of the plurality of stiffeners is disposed on the inner perimeter between two of the plurality of retention members. Each of the plurality of stiffeners comprises a lip extending in the engaging direction.

The present invention also provides a sheet metal clip for securing a first generally cylindrical housing member to a second generally cylindrical housing. The clip comprises a planar annulus, a plurality of retention members, and a plurality of stiffeners.

The planar annulus includes an inner perimeter, an outer perimeter, and defines a central axis. The plurality of retention members are uniformly disposed about the inner perimeter of the planar annulus. The plurality of stiffeners are arranged so that at least one of the plurality of stiffeners is disposed on the inner perimeter between two adjacent retention members of the plurality of retention members.

Each of the plurality of retention members includes a leg portion, a hook portion, and an arcuate portion disposed between the leg portion and the hook portion. The leg portion extends in an engaging direction and is substantially parallel to the central axis. The hook portion projects from the leg portion so that the central axis and a plane that passes through the hook portion form an angle in the range of approximately 20°–30°. The hook portion has a free end positioned on an imaginary circle concentric to the inner perimeter of the planar annulus.

The present invention also provides a method of retaining a first generally cylindrical housing to a second generally cylindrical housing while allowing for relative rotation between the cylindrical housings. The method comprises: (1) providing a sheet metal clip having an annulus and a plurality of retention members, each of the plurality of retention members including a leg portion and a hook portion, the leg portion extending from an inner perimeter of the annulus, the hook portion projecting from the leg portion toward a central axis of the annulus, the hook portion being acute to the central axis; (2) positioning the annulus of the clip within a retaining portion of the first housing member; and (3) locating the first housing member proximate the second housing member so that a free end of the hook portion of each of the retention members engages a protrusion on the second housing.

The present invention further provides a method of stamping a clip, which retains a first generally cylindrical housing to a second generally cylindrical housing. The method of stamping comprises: (1) punching a sheet metal circular configuration, the circular configuration having an interior cutout so that a plurality of substantially trapezoidal sheet metal members extending toward the central axis of the circular configuration; and (2) forming each of the plurality of substantially trapezoidal sheet metal members into a retention members having a planar leg portion and a planar hook portion, the planar leg portion extending from an inner perimeter of an planar annulus created from the circular configuration, the planar hook portion projecting from the planar leg portion toward the central axis of the circular configuration, the planar hook portion being acute to the central axis.

BRIEF DESCRIPTION OF THE DRAWINGS

The accompanying drawings, which are incorporated herein and constitute part of this specification, illustrate presently preferred embodiments of the invention, and, together with a general description given above and the detailed description of the preferred embodiments given below, serve to explain the principles of the invention.

DETAILED DESCRIPTION OF THE PREFERRED EMBODIMENT(S)

Figure 1:
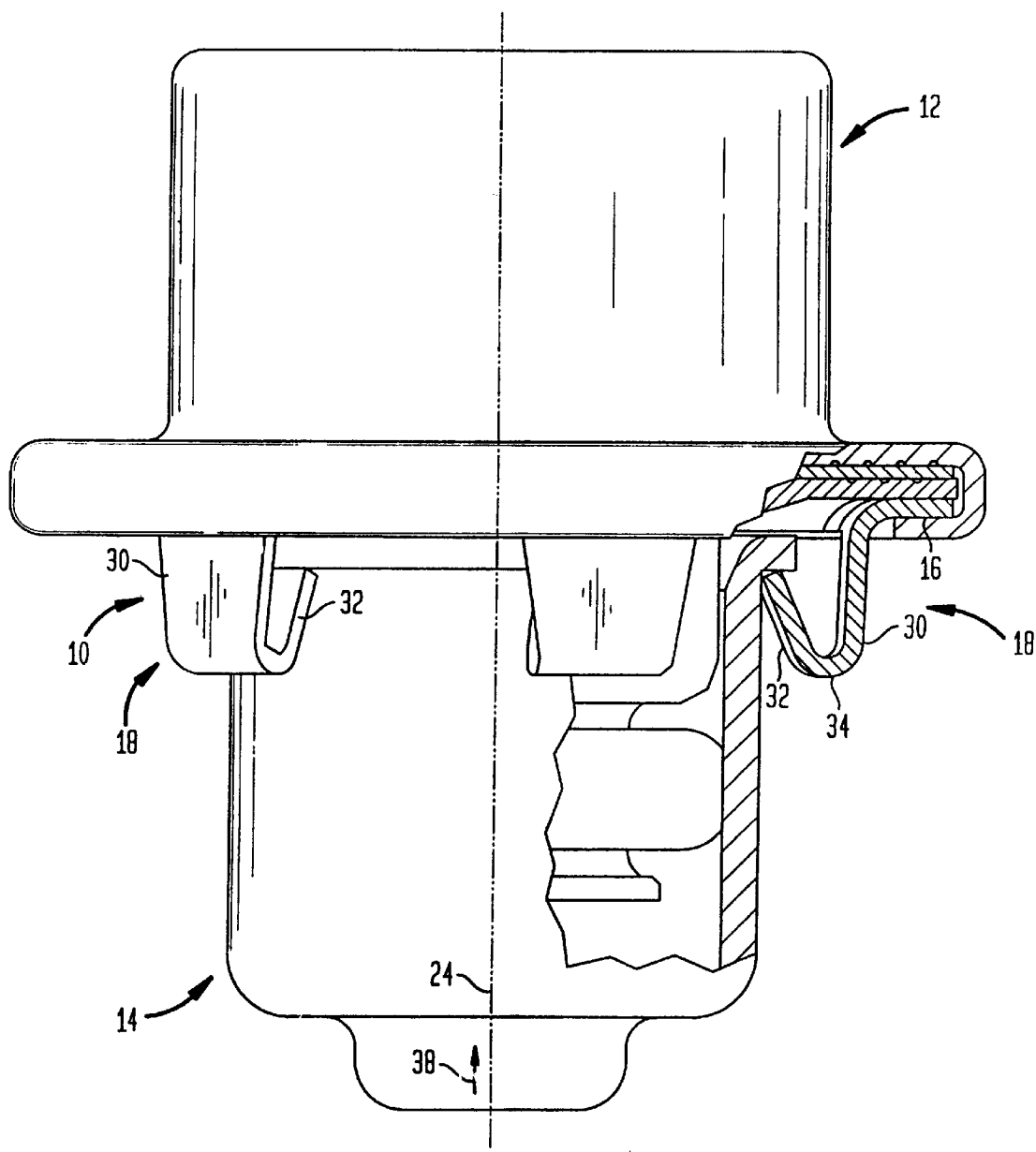
FIG. 1 is a partial cross sectional perspective view of the clip of the present invention securing a first housing to a second housing.

FIG. 1 shows the sheet metal clip 10 for securing a first housing 12 to a second housing 14 of the preferred embodiment. The first housing 12 and the second housing 14 are, preferably, generally cylindrical housing members, however, it is to be understood that other configurations could be employed depending on the particular intended application.

Figure 2:
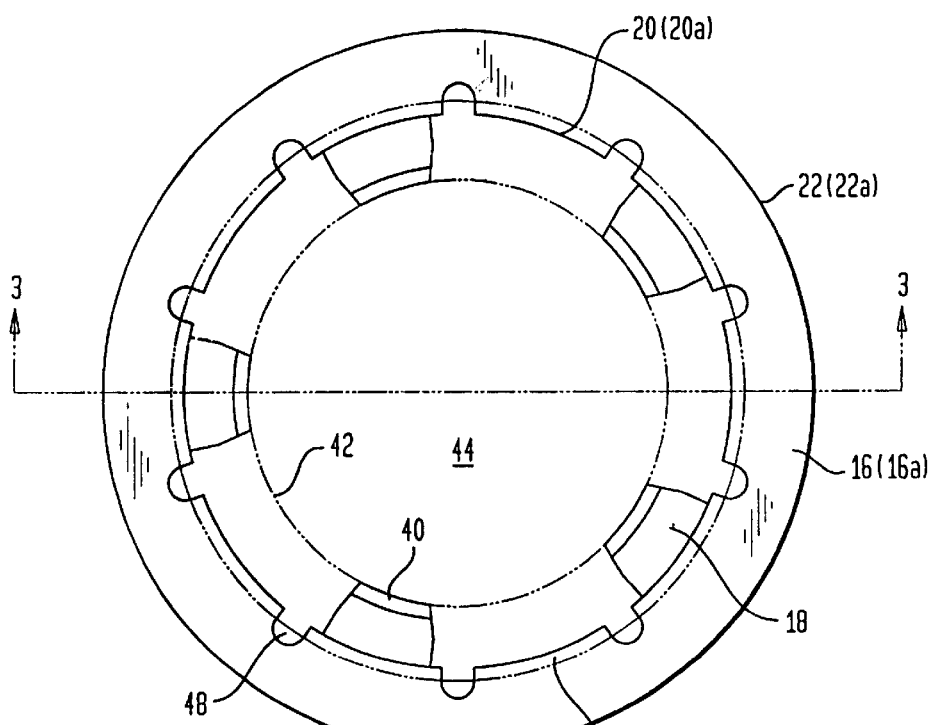
FIG. 2 is a top view of the clip of the present invention.
Figure 3:
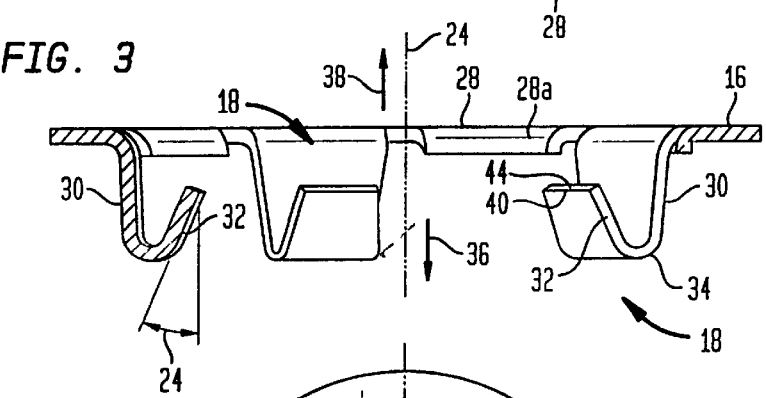
FIG. 3 is a cross sectional view of the clip shown in FIG. 2 taken along the line 3—3 in FIG. 2.

As shown in FIGS. 1–3, the clip 10 of the present invention comprises a planar member 16 and at least one retention member 18 attached to the planar member 16. The planar member 16 is held in place by the first housing 12 so that the retention member 18 can engage a portion of the second housing 14 to secure the housings together.

The planar member 16 includes an inner perimeter 20, an outer perimeter 22, and defines a central axis 24. The planar member 16 is preferably a planar annulus with a geometric configuration, such as, for example, square, rectangle, oval, circle, which is selected to correspond to the employed housing configuration. In the preferred embodiment planar member 16 comprises a planar annulus with a circle configuration.

The circular annulus 16*a* has an inner circular perimeter 20*a* concentric to an outer circular perimeter 22*a*. A planar support surface 26 is disposed between the inner and outer perimeters 20, 22.

The at least one retention member 18 attached to the planar annulus 16, preferably, comprises a plurality of retention members 18 uniformly disposed about the inner perimeter 20 of the planar annulus, more particularly, five retention members 18. The clip 10 of the preferred embodiment further includes a plurality of stiffeners 28 attached to the planar member 16 with at least one stiffener between two of the plurality of retention members 18.

In the preferred embodiment the planar member 16, the plurality of retention members 18, and the plurality of stiffeners 28 comprise a unitary sheet of metal. That is, the clip 10 of the present invention is, preferably, made from sheet metal.

Each of the plurality of retention members includes a leg portion 30, a hook portion 32, and an arcuate portion 34 disposed between the leg portion 30 and hook portion 32. The leg portion 30 and the hook portion 32 are, preferably, also planar and are formed from a bent substantially trapezoidal configuration, as discussed below in reference to FIG. 4.

The leg portion 30 extends from the inner perimeter 20 of the annulus in a first direction 36 along the central axis 24. The leg portion 30 is substantially parallel to the central axis 24. The first direction 36 defines an engaging direction. That is, the direction the retention members 18 are moved so that the clip 10 of the present invention, which is supported by the first housing, engages the second housing 14.

The hook portion 32 projects from the leg portion 30 toward the central axis 24 in a second direction 38. The second direction 38 is generally opposite the first direction 36 along the central axis 24. The hook portion 32 projects from the leg portion 30 so that the central axis 24 and a plane (P shown in FIG. 3) passing through the hook portion 32 form an angle in the range of approximately 20°–30°. Preferably, the angle comprises approximately 24°.

The hook portion 32 of each of the plurality of retention members includes a free end 40 located on an imaginary perimeter 42 concentric to the inner perimeter 20 of the planar member 16. Because in the preferred embodiment of the invention the planar member 16 comprises an annulus with a circular inner perimeter 20*a*, the imaginary perimeter 42 of the preferred embodiment also comprises a circle. The free end 40 of the hook portion 32 is positioned to provide face 44. The face 44 provides a bearing surface that engages the protrusion 46 of the second housing 14 member.

By providing each of the free ends 40 of each of the hook portions 32 on the imaginary perimeter 42 that corresponds to the selected inner perimeter 20 of the planar member 16, the clip 10 is self-tightening once installed in a housing-retaining position. More particularly, in the preferred embodiment of the invention, the free ends 40 of the respective hook portions 32 of the plurality of the retaining members are uniformly disposed about the imaginary perimeter 42. This uniform dispersion of the free ends 40 about the imaginary perimeter 42 applies a balanced retaining force to the engaged (second) housing that increases as the annulus of the clip 10 is axially displaced in the non-engaging direction or the annulus of the clip 10 is maintained in a stationary location while the engaged housing is axially moved in the engaging direction. The applied force is also believed to increase because of the unique relationship between the hook portion 32 and the leg portion 30 of each of the retention members.

Even though it is believed that the self-tightening feature of the preferred embodiment is best achieved by having a plurality of retention members uniformly dispersed about the planar annulus, the self-tightening feature of the clip 10 could also be achieved with a single retention member. A single retention member, however, allows for the first housing 12 to be removed from the second housing 14 by rocking the second housing 14 about the central axis 24 so that the single retention member disengages from the second housing 14. To overcome the removability of the first housing from the second housing 14 when a single retention member is employed, two retention members disposed at approximately opposite positions on the inner perimeter 20 could be employed. In order to ensure that the first housing 12 is secured to the second housing 14 so that removal by rocking the first housing 12 is prevented, a clip 10 with three uniformly disposed retention members could be employed.

As shown in FIGS. 1–3, the free end 40 of the hook portion 32 is disposed at approximately a third of the distance the leg portion 30 extends from the planar annulus in the engaging direction. Also, each of the leg portions 30 and the hook portions 32 is, preferably, substantially planar members. Because of the dimensioning and configuration of the hook portion 32, it is believed that during loading of the retention member along the central axis 24 opposite the engaging direction, the hook portion 32 acts as a short column that pushes the hook supporting end of the leg portion 30 away from the central axis 24. While the hook supporting end of the leg portion 30 of the retaining member is pushed away from the central axis 24, due to the elastic quality of the sheet metal used to form the preferred clip 10, it is believed that the loading force is substantially applied to the hook portion 32 of the retaining member until plastic or sheering deformation of the leg portion 30 of the retaining member or the protrusion 46 on the second housing 14. Instron pull testing of the preferred embodiment of the invention (inner perimeter 20 approximately 21 mm, outer perimeter 22 approximately 27 mm, leg portion 30 approximately 4.25 mm, and hook portion 32 approximately 2.8 mm) has confirmed that the retention ability of the clip 10 of the preferred embodiment continues to increase until catastrophic failure of the leg portion 30 or the second housing 14 occurs at approximately 700 psi.

The plurality of stiffeners 28 attached to the inner perimeter 20 of the planar member 16, annulus, increase the structural rigidity of the unitary sheet metal clip 10 of the present invention. At least one of the plurality of stiffeners 28 is disposed on the inner perimeter 20 between two adjacent retention members of the plurality of retention members 18. Preferably, each of the plurality of stiffeners 28 comprises a lip 28*a* extending in the engaging direction from the inner perimeter 20 of the planar annulus.

A cut-out 48 is provided on the inner perimeter 20 of the planar annulus between each of the plurality of retention members and each stiffener. The cut-out 48 relieves stress created in the support surface of the planar annulus. The cut-out 48, preferably, is a semicircle formed in the support surface 26 between the leg of the retention member and the lip 28*a*, which serves as the stiffener.

The present invention also includes a method of retaining a first generally cylindrical housing to a second generally cylindrical housing while allowing for relative rotation between the housings. The method is achieved by providing a sheet metal clip 10 having an annulus and a plurality of retention members. As discussed above, the preferred sheet metal clip 10 includes five retention members uniformly disposed about the inner perimeter 20 of the annulus, each of the retention members having at least a portion of the free end 40 of their respective hook portion 32 located on an imaginary circle that is concentric to the inner perimeter 20 of the annulus.

After the clip 10 has been provided, the annulus of the clip 10 is positioned within a retaining portion of the first housing 12. Then, the first housing 12 is located proximate the second housing 14 so that the free end 40 of the hook portion 32 of each of the retention members engages a protrusion 46 on the second housing 14.

The present invention also provides a method of stamping a clip 10 for retaining a first generally cylindrical housing to a second generally cylindrical housing. The steps of stamping include punching and forming a single sheet of metal in a uniform sequence of steps. First, a particular configuration is punched from a metal sheet. The preferred configuration is a circular configuration having an open interior so that a plurality of substantially trapezoidal sheet metal members 50 extends toward the central axis 24 of the circular configuration. Once the particular configuration is punched, each of the plurality of substantially trapezoidal sheet metal members 50 is formed into a retention members having a planar leg portion 30 and a planar hook portion 32. The planar leg portion 30 is formed to extend from an inner perimeter 20 of a planar member 16, preferably, a circular annulus 16a, created from the particular configuration, while the planar hook portion 32 is formed to project from the planar leg portion 30 toward the central axis 24 of the particular configuration.

Figure 4:
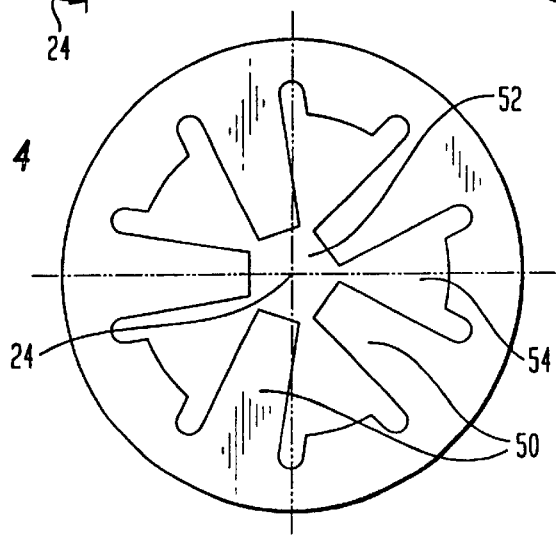
FIG. 4 is a top view of the sheet metal configuration use to form the clip of the present invention.

As shown in FIG. 4, the preferred embodiment of the punched configuration before forming provides the interior as a centrally located pentagon 52 with a generally triangular members 54 extending from each corner of the pentagon. After the preferred embodiment is punched, the geometric configuration is formed so that the planar hook portion 32 is acute to the central axis 24 so that the central axis 24 and a plane passing through the hook portion 32 form an angle in the range of approximately 20°–30°, and a stiffener is located on the inner perimeter 20 between each of the plurality of retention members 18.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A method of retaining a first generally cylindrical housing to a second generally cylindrical housing while allowing for relative rotation between the housings, the second generally cylindrical housing having a protrusion, the method comprising:

providing a sheet metal clip having an annulus disposed about a central axis, the annulus having a plurality of retention members, each of the plurality of retention member including a leg portion and a hook portion, the leg portion extending in a first direction from an inner perimeter of the annulus along the central axis, the hook portion projecting from the leg portion toward the central axis in a second direction opposite the first so as to define an imaginary perimeter concentric to the inner perimeter, the hook portion being acute to the central axis;

supporting the annulus of the clip within a retaining portion of the first housing; and engaging the hook portion of the clip with the protrusion of the second housing in the first direction to position the protrusion into a space between the imaginary perimeter and inner perimeter so that the hook portion self-tightens on the protrusion when the second housing is moved away from the first housing along the central axis.

2. The method of claim 1, the step of providing further comprises:

providing the sheet metal clip with five retention members uniformly disposed about the inner perimeter of the annulus, each of the retention members having at least a portion of the free end of their respective hook portions located on an imaginary circle that is concentric to the inner perimeter of the annulus.

3. The method of claim 1, wherein each of the plurality of retention members includes an arcuate portion disposed between the hook portion and the leg portion.

4. The method of claim 3, wherein the plurality of retention members includes five retention members.

5. The method of claim 4, wherein the five retention members are disposed equi-angularly about the central axis.

6. The method of claim 1, wherein the providing further includes providing a plurality of stiffeners, at least one of the plurality of stiffeners being disposed on the inner perimeter between any two of the plurality of retention members so as to increase the structural rigidity of the clip.

7. The method of claim 6, wherein each of the plurality of stiffeners includes a lip facing in the first direction along the central axis.

8. The method of claim 6, wherein the sheet metal clip, including the plurality of retention members and stiffeners, includes an unitary sheet of metal.

9. The method of claim 6, wherein the providing further includes providing at least one cut-out on the inner perimeter of the annulus between each of the plurality of retention members and each stiffener.

10. The method of claim 9, wherein the at least one cut-out includes a semi-circle.

11. The method of claim 1, wherein the central axis and a plane passing through the hook portion of the at least one retention member form an angle in the range of approximately 20 degrees to approximately 30 degrees.

12. The method of claim 11, wherein the angle is of approximately 24 degrees.

13. The method of claim 1, wherein each of the plurality of retention members includes a substantially trapezoidal configuration.

14. The method of claim 1, further including:

Instron pull testing the first housing away from the second housing along the central axis; and retaining the clip to the first and second housings until catastrophic failure of at least one of the second housing and the clip.

* * * * *